United States Patent
Zheng et al.

(10) Patent No.: US 9,170,775 B2
(45) Date of Patent: Oct. 27, 2015

(54) FLEXIBLE ACCUMULATOR IN DIGITAL SIGNAL PROCESSING CIRCUITRY

(75) Inventors: Leon Zheng, San Jose, CA (US); Martin Langhammer, Southway Alderbury (GB); Nitin Prasad, Milpitas, CA (US); Greg Starr, San Jose, CA (US); Chiao Kai Hwang, Fremont, CA (US); Kumara Tharmalingam, Santa Clara, CA (US)

(73) Assignee: Altera Corporation, San Jose, CA (US)

( * ) Notice: Subject to any disclaimer, the term of this patent is extended or adjusted under 35 U.S.C. 154(b) by 784 days.

(21) Appl. No.: 12/683,686

(22) Filed: Jan. 7, 2010

(65) Prior Publication Data

US 2010/0169404 A1 Jul. 1, 2010

Related U.S. Application Data (62) Division of application No. 10/783,789, filed on Feb. 20, 2004, now Pat. No. 7,660,841.

(51) Int. Cl.
*G06F 7/38* (2006.01)
*G06F 7/544* (2006.01)

(52) U.S. Cl.
CPC ...... *G06F 7/5443* (2013.01); *G06F 2207/3884* (2013.01)

(58) Field of Classification Search
None
See application file for complete search history.

(56) References Cited

U.S. PATENT DOCUMENTS

| | | | |
|---|---|---|---|
| 4,876,660 A * | 10/1989 | Owen et al. | 708/603 |
| 4,996,661 A | 2/1991 | Cox et al. | |
| 5,311,459 A | 5/1994 | D'Luna et al. | |
| 6,430,677 B2 | 8/2002 | Pechanek et al. | |
| 6,538,470 B1 | 3/2003 | Langhammer et al. | |
| 6,597,923 B1 * | 7/2003 | Vanghi et al. | 455/522 |
| 6,628,140 B2 | 9/2003 | Langhammer et al. | |
| 6,643,768 B2 * | 11/2003 | Ganapathy et al. | 712/221 |
| 6,665,695 B1 | 12/2003 | Brokish et al. | |
| 6,665,696 B2 | 12/2003 | Brokish | |
| 6,697,444 B1 * | 2/2004 | Iizuka et al. | 375/343 |
| 6,711,301 B1 | 3/2004 | Tran et al. | |
| 6,781,408 B1 * | 8/2004 | Langhammer | 326/41 |
| 7,107,302 B1 | 9/2006 | Fridman et al. | |
| 7,142,011 B1 | 11/2006 | Langhammer | |
| 7,567,997 B2 | 7/2009 | Simkins et al. | |
| 2004/0264601 A1 * | 12/2004 | Demir et al. | 375/322 |
| 2006/0075012 A1 | 4/2006 | Minz et al. | |

* cited by examiner

*Primary Examiner* — Henry Tsai
*Assistant Examiner* — Aurangzeb Hassan
(74) *Attorney, Agent, or Firm* — Ropes & Gray LLP (57) ABSTRACT

A multiplier-accumulator (MAC) block can be programmed to operate in one or more modes. When the MAC block implements at least one multiply-and-accumulate operation, the accumulator value can be zeroed without introducing clock latency or initialized in one clock cycle. To zero the accumulator value, the most significant bits (MSBs) of data representing zero can be input to the MAC block and sent directly to the add-subtract-accumulate unit. Alternatively, dedicated configuration bits can be set to clear the contents of a pipeline register for input to the add-subtract-accumulate unit.

15 Claims, 11 Drawing Sheets

FLEXIBLE ACCUMULATOR IN DIGITAL SIGNAL PROCESSING CIRCUITRY

CROSS REFERENCE TO RELATED APPLICATIONS

This is a divisional of commonly assigned U.S. patent application Ser. No. 10/783,789, filed Feb. 20, 2004, now U.S. Pat. No. 7,660,841 which is hereby incorporated herein by reference in its entirety.

BACKGROUND OF THE INVENTION

This invention relates to digital signal processing (DSP) circuitry. More particularly, this invention relates to providing a flexible accumulator in DSP circuitry.

A programmable logic resource is a general-purpose integrated circuit that is programmable to perform any of a wide range of logic tasks. Known examples of programmable logic resource technology include programmable logic devices (PLDs), complex programmable logic devices (CPLDs), erasable programmable logic devices (EPLDs), electrically erasable programmable logic devices (EEPLDs), and field programmable gate arrays (FPGAs).

Manufacturers of programmable logic resources, such as Altera® Corporation of San Jose, Calif., have recently begun manufacturing programmable logic resources that, in addition to programmable logic circuitry, also include hardware DSP circuitry in the form of multiplier-accumulator (MAC) blocks. The MAC blocks of programmable logic resources provide a way in which certain functionality of a user's design may be implemented using less space on the programmable logic resource, thus resulting in a faster execution time because of the nature of DSP circuitry relative to programmable logic circuitry. MAC blocks may be used in the processing of many different types of applications, including graphics applications, networking applications, communications applications, as well as many other types of applications.

MAC blocks are made of a number of multipliers, accumulators, and adders. The accumulators can perform add, subtract, or accumulate operations. Typically, there are four multipliers, two accumulators, and an adder in a MAC block. The MAC block can have a plurality of modes which may be selectable to provide different modes of operation.

During one mode of operation, the MAC block can implement multiply-and-accumulate operations. During this mode of operation, each accumulator adds or subtracts the output of a multiplier from an accumulator value. The accumulator value can be a value previously computed by the accumulator and stored in an output register. In known MAC blocks, the accumulator value can be zeroed by setting a control signal to clear the output register. In addition, known MAC blocks do not allow for the accumulator value to be initialized to a non-zero value with minimum clock latency.

In view of the foregoing, it would be desirable to provide a MAC block that can zero an accumulator value without introducing clock latency and that can also initialize the accumulator value with minimum clock latency.

SUMMARY OF THE INVENTION

In accordance with the invention a multiplier-accumulator (MAC) block is provided that can zero an accumulator value without introducing clock latency and that can also initialize the accumulator value with minimum clock latency.

When a MAC block implements at least one multiply-and-accumulate operation, the MAC block can zero or initialize an accumulator value for each accumulator that implements a multiply-and-accumulate operation. The accumulator value can be zeroed or initialized using circuitry in the MAC block that is typically not used during a multiply-and-accumulate operation.

When the MAC block does not implement a parallel scan chain at the input registers, the accumulator value can be zeroed by setting input signals (which make up the most significant bits of the accumulator value) and an accumulator feedback signal (which makes up the least significant bits of the accumulator value) to zero. The input signals and the accumulator feedback signal can be sent as input to the accumulator where the data is concatenated to form the zeroed accumulator value.

When the MAC block implements a parallel scan chain, the accumulator value can be zeroed by clearing a pipeline register based on a configuration bit that signals when to clear the pipeline register (which makes up the most significant bits of the accumulator value) and setting an accumulator feedback signal (which makes up the least significant bits of the accumulator value) to zero. The contents of the pipeline register and the accumulator feedback signal can be sent as input to the accumulator where the data is concatenated to form the zeroed accumulator value. In both embodiments, the output of a multiplier can be added to or subtracted from the zeroed accumulator value during the same clock cycle.

The accumulator value can also be initialized by setting a first pair of input signals to a value that when concatenated in a predetermined order make up the most significant bits of the accumulator value and by setting a second pair of input signals to another value that when multiplied together makes up the least significant bits of the accumulator value. The first pair of input signals, which are concatenated, and an accumulator feedback signal (which makes up the least significant bits of the accumulator value) that is set to zero are sent as input to the accumulator where the data is concatenated and added to the output of the multiplier to form the initialized accumulator value.

The invention provides for a more flexible accumulator in MAC blocks. The accumulator value can be zeroed without introducing clock latency and can be initialized to a non-zero value in one clock cycle.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

In accordance with the invention a multiplier-accumulator (MAC) block is provided that can zero an accumulator value without introducing clock latency and that can also initialize the accumulator value to a non-zero value in one clock cycle.

A MAC block can be selected to operate in any suitable mode of operation. For example, for a MAC block having four 18-bit by 18-bit multipliers, where each multiplier can generate a 36-bit output that is the product of two 18-bit multiplicand inputs or two products (concatenated into a 36-bit product) of two pairs of 9-bit multiplicand inputs (concatenated into one pair of 18-bit inputs), suitable modes of operation include, for example, an 18-bit by 18-bit multiplier, a 52-bit accumulator (e.g., multiply-and-accumulate), an accumulator initialization, a sum of two 18-bit by 18-bit multipliers, a sum of four 18-bit by 18-bit multipliers, a 9-bit by 9-bit multiplier, a sum of two 9-bit by 9-bit multipliers, a sum of four 9-bit by 9-bit multipliers, a 36-bit by 36-bit multiplier, or other suitable modes. It will be understood that these are merely illustrative modes that may be supported by a MAC block in accordance with the present invention. Other suitable modes may by supported. Such support of modes may be determined based on any suitable factors, including, for example, application needs, size of available multipliers, number of multipliers, or other suitable factors. For example, it is clear that if a MAC block included eight 9-bit by 9-bit multipliers, different modes may be used (e.g., sum of eight 9-bit by 9-bit multipliers).

A MAC block can allow its components to perform one mode of operation or alternatively, can allow its components to be split to perform more than one mode of operation simultaneously. One or more multipliers of the MAC block may be designated to operate in one mode (e.g., a multiplier mode) whereas one or more other multipliers of the MAC block may be designated to operate in another mode (e.g., sum of multipliers mode). A single MAC block can support different modes of operation that require different numbers of multipliers. For example, two multipliers may be used in one mode, whereas only one multiplier may be used in a second mode. Any suitable circuitry and any suitable control signals may be used to allow a MAC block to operate in the different modes of operation.

In some embodiments, a MAC block may be split into two or more sections of multipliers. Modes may be designated according to section, whereby all the multipliers in a section of multipliers are operating in the same mode. This arrangement may provide a more simple organization of control signals and provides a balance between flexibility and simplicity. Sections may be defined based on modes that are desired to be used. For example, if all multipliers of a MAC block are to be used in a particular mode, then splitting will not occur. If half the multipliers are needed for a particular mode, then the MAC block may be split such that there are two sections, each having half of the multipliers. Each of the two sections may then be operated under a different mode if desired. In one suitable approach, a section may be further split. For example, a MAC block may be split among three modes where one of the modes uses half of the multipliers, a second mode uses a quarter of the multipliers, and a third mode uses a quarter of the multipliers. A MAC block may be split among four modes where each mode uses one quarter of the available multipliers. Any such suitable mode splitting may be done in accordance with the present invention. If all the multipliers of a MAC block are required, then the MAC block will operate under a single mode.

Allowing a MAC block to operate in more than one mode of operation simultaneously allows for more efficient use of digital signal processing resources that are available in a particular programmable logic resource.

In accordance with the invention, when a MAC block implements at least one multiply-and-accumulate operation, the MAC block can zero an accumulator value without introducing clock latency and can initialize the accumulator value with minimum clock latency for each accumulator that implements a multiply-and-accumulate operation. The accumulator value can be zeroed or initialized using circuitry in the MAC block that is typically not used during a multiply-and-accumulate operation.

When the MAC block does not implement a parallel scan chain at the input registers, the accumulator value can be zeroed by setting input signals (which make up the most significant bits of the accumulator value) and an accumulator feedback signal (which makes up the least significant bits of the accumulator value) to zero. The input signals and the accumulator feedback signal can be sent as input to the accumulator where the data is concatenated to form the zeroed accumulator value.

When the MAC block implements a parallel scan chain, the accumulator value can be zeroed by clearing a pipeline register based on a configuration bit that signals when to clear the pipeline register (which makes up the most significant bits of the accumulator value) and setting an accumulator feedback signal (which makes up the least significant bits of the accumulator value) to zero. The contents of the pipeline register and the accumulator feedback signal can be sent as input to the accumulator where the data is concatenated to form the zeroed accumulator value. In both embodiments, the output of a multiplier can be added to or subtracted from the zeroed accumulator value during the same clock cycle. Zeroing the accumulator value does not introduce clock latency.

The accumulator value can also be initialized by setting a first pair of input signals to a value that when concatenated in a predetermined way make up the most significant bits of the accumulator value and by setting a second pair of input signals to another value that when multiplied together makes up the least significant bits of the accumulator value. The first pair of input signals, which are concatenated, and an accumulator feedback signal (which makes up the least significant bits of the accumulator value) that is set to zero are sent as input to the accumulator where the data is concatenated and added to the output of the multiplier to form the initialized accumulator value. Initializing the accumulator value takes one clock cycle. The invention advantageously provides for a more flexible accumulator whose accumulator value can be zeroed or initialized to a non-zero value with minimal or no clock latency.

Figure 1:
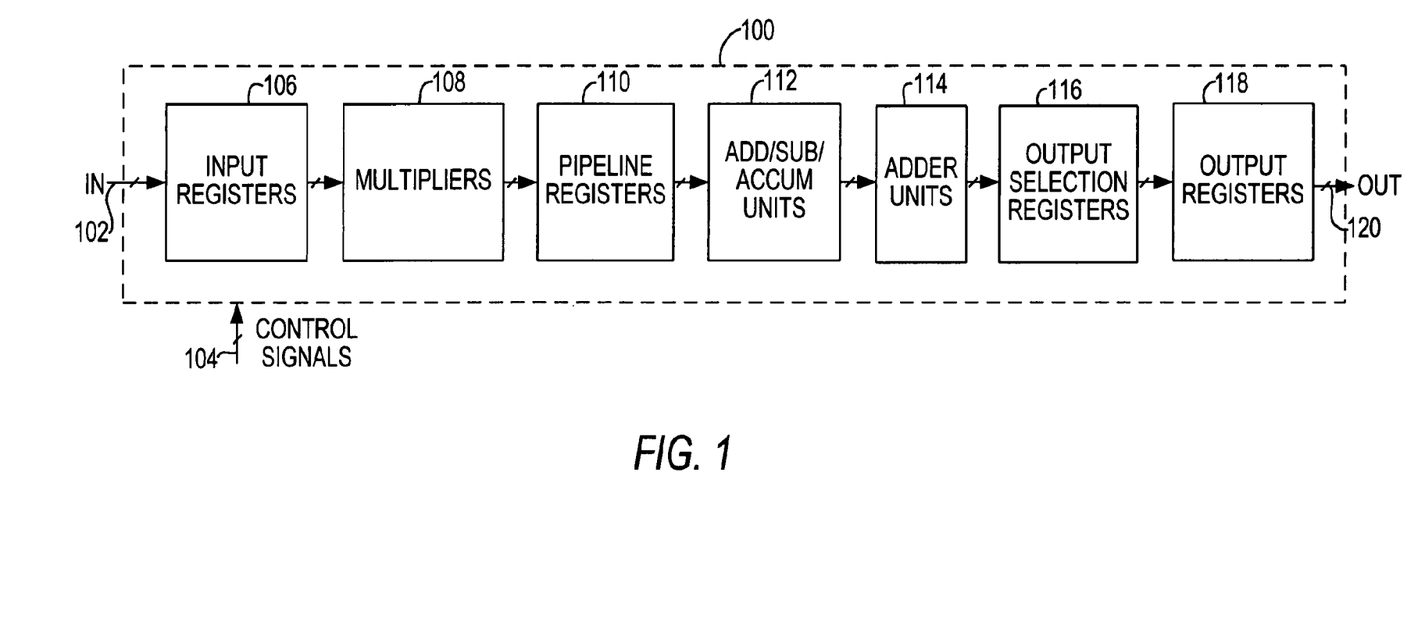
FIG. 1 is a simplified block diagram of digital signal processing circuitry in the form of a multiplier-accumulator (MAC) block in accordance with the invention.

FIG. 1 shows a digital signal processing block implementing a MAC block 100 that receives input signals 102 and control signals 104. Input signals 102 include data that is to be processed in one or more modes of operation in MAC block 100 and can be set by circuitry in a programmable logic resource. Control signals 104 include data that is used to control the operation of circuitry in MAC block 100 in the different modes of operation and can be set by circuitry in a programmable logic resource, by user input, or a combination of the same.

MAC block 100 includes input register block 106, multiplier block 108, pipeline register block 110, add-subtract-accumulate units 112, adder units 114, output selection register block 116, and output register block 118. Input register block 106 receives input signals 102 and can be programmed to register signals 102 or to pass signals 102 directly to block 108. Input registers in block 106 that implement a parallel scan chain can be programmed to pass signals 102 to a directly corresponding multiplier or to another multiplier in block 108. Input registers in block 106 that do not implement a parallel scan chain can be programmed to pass signals 108 to a directly corresponding multiplier in block 108. Multiplier block 108 can include a predetermined number of multipliers that can each be programmed to perform a multiply operation on data from two registers in block 106 or to send the data from the two registers directly to the output. Pipeline register block 110 receives the outputs of block 108 and can be programmed to register the outputs or to pass the outputs directly to corresponding add-subtract-accumulate units 112. Each unit 112 can be programmed to perform an add or subtract operation on two outputs from block 110, to perform an add or subtract operation on one output from block 100 with an accumulator value that was previously computed by the unit 112, to zero the accumulator value, to initialize the accumulator value, or to send the data from corresponding pipeline registers in block 110 directly to the output. Adder units 114 receives the outputs of units 112 and can be programmed to perform an add or subtract operation on the outputs from units 112 or to send the outputs directly to output selection register block 116. There may be more than one unit 114 that may be cascaded depending on the number of multipliers in block 108 and add-subtract-accumulate units 112. Block 116 selects the data for output to output register block 118 for output as signal 120. Depending on the mode of operation of MAC block 100, some or all of the circuitry may be used. Circuitry that is not used can be programmed to allow data received at the input to be directly sent to the output.

Figure 2:
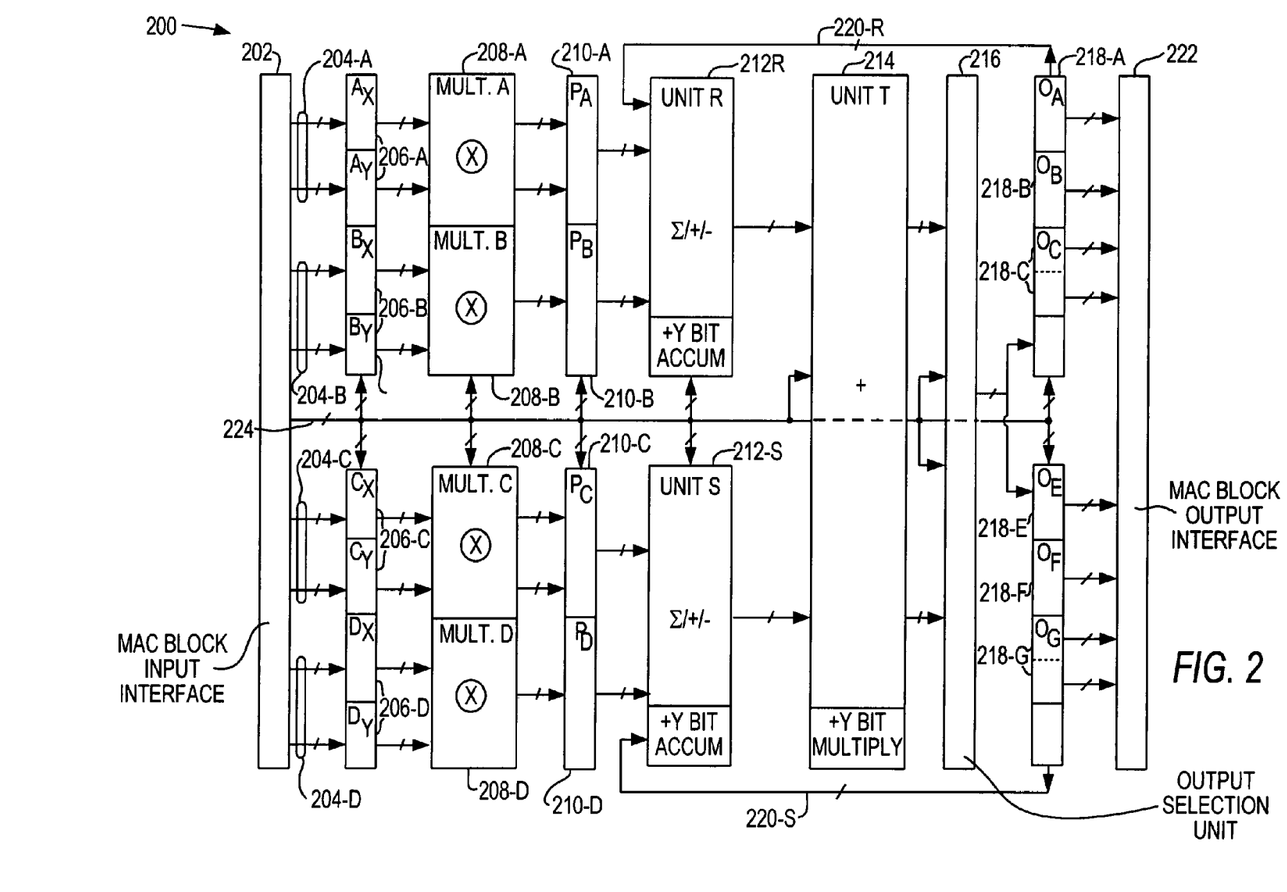
FIG. 2 is a more detailed but still simplified block diagram of one embodiment of the MAC block of FIG. 1 in accordance with the invention.

FIG. 2 shows a more detailed block diagram of one embodiment of a MAC block 200. MAC block 200 receives input signals and control signals via a MAC block input interface 202. Interface 202 sends input signals 204 to corresponding input registers 206. There can be eight input registers 206 (e.g., $A_X$, $A_Y$, $B_X$, $B_Y$, $C_X$, $C_Y$, $D_X$, $D_Y$). Interface 202 also sends control signals 224 to the circuitry in MAC block 200.

The outputs of input registers 206 are sent as input to multipliers 208. There can be four multipliers 208 (e.g., MULT. A, MULT. B, MULT. C, MULT D). If a parallel scan chain is not used, each multiplier 208 receives as input data from two corresponding input registers 206 (e.g., MULT. A receives data from registers $A_X$ and $A_Y$, MULT. B receives data from registers $B_X$ and $B_Y$, MULT. C receives data from registers $C_X$ and $C_Y$, MULT. D receives data from registers $D_X$ and $D_Y$). If a parallel scan chain is used, each multiplier 208 can receive as input data from two corresponding input registers 206 or from two other input registers 206 (e.g., MULT. B can receive data from registers $A_X$ and $A_Y$).

The outputs of multipliers 208 are sent as input to pipeline registers 210. There can be four pipeline registers 210 (e.g., $P_A$, $P_B$, $P_C$, $P_D$) that each receives data from a corresponding multiplier 208 (e.g., $P_A$ receives data from MULT. A, $P_B$ receives data from MULT. B, $P_C$ receives data from MULT. C, $P_D$ receives data from MULT. D).

The outputs of pipeline registers 210 are sent as input to add-subtract-accumulate units 212. There can be two add-subtract-accumulate units 212 (e.g., UNIT R, UNIT S) that each receives data from two corresponding pipeline registers 210 (e.g., UNIT R receives data from $P_A$ and $P_B$, UNIT S receives data from $P_C$ and $P_D$). The outputs of add-subtract-accumulate units 212 are sent as input to an adder unit 214 (e.g., UNIT T). The output of adder unit 214 is set as input to output selection unit 216 whose output is sent as input to corresponding output registers 218 (e.g., $O_A$, $O_B$, $O_C$, $O_G$, $O_F$, $O_G$). The contents of output registers 218 can be fed back to corresponding add-subtract-accumulate units 212 via feedback path 220 and are also sent to MAC block output interface 222 for output from MAC block 200.

Control signals 224 can include any suitable signals used to set the mode of operation for MAC block 200 and to process data in MAC block 200. Control signals 224 can be used to control input registers 206, multipliers 208, pipeline registers 210, add-subtract-accumulate units 212, adder unit 214, output selection unit 216, and output registers 218. Control signals 224 can include, for example, signals to clock the input and output of data for each input register 206, pipeline register 210, and output register 218; signals to clear the contents of each input register 206, pipeline register 210, and output register 218; signals to implement MAC block 200 in a particular mode of operation (e.g., programming multipliers 208, add-subtract-accumulate units 212, and adder unit 214 to operate in a predetermined way); signals to set the number representation for a multiply operation for each multiplier 208; signals to set an add, subtract, and/or accumulate operation for each add-subtract-accumulate unit 212; signals to set an add or subtract operation for adder unit 214; and other suitable signals.

Figure 3:
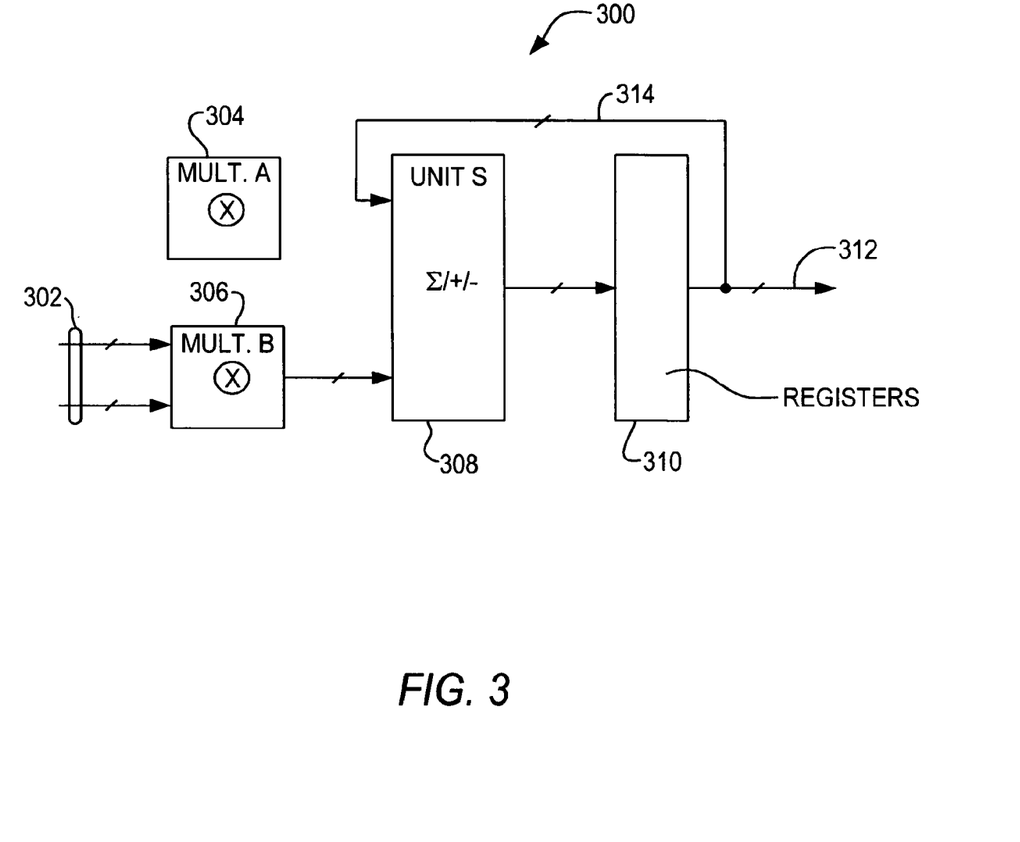
FIG. 3 is a simplified, partial block diagram of a MAC block that implements a multiply-and-accumulate operation in accordance with the invention.

FIG. 3 shows a simplified, partial block diagram of a MAC block 300 that implements a multiply-and-accumulate operation. Block 300 includes two multipliers 304 and 306, an add-subtract-accumulate unit 308, and output registers 310. (For simplicity, the input registers, pipeline registers, adder unit, output selection unit, and control signals are not shown.) Multiplier 304 is not used in typical multiply-and-accumulate operations. Multiplier 306 receives two multiplicand inputs 302 that are multiplied to produce an output that is sent to add-subtract-accumulate unit 308. Add-subtract-accumulate unit 308 can add or subtract the output from multiplier 306 with an accumulator value stored in registers 310 (which is sent to add-subtract-accumulate unit 308 via feedback path 314) to produce a new accumulator value. The new accumulator value is sent to registers 310 for output via path 312.

Figure 4:
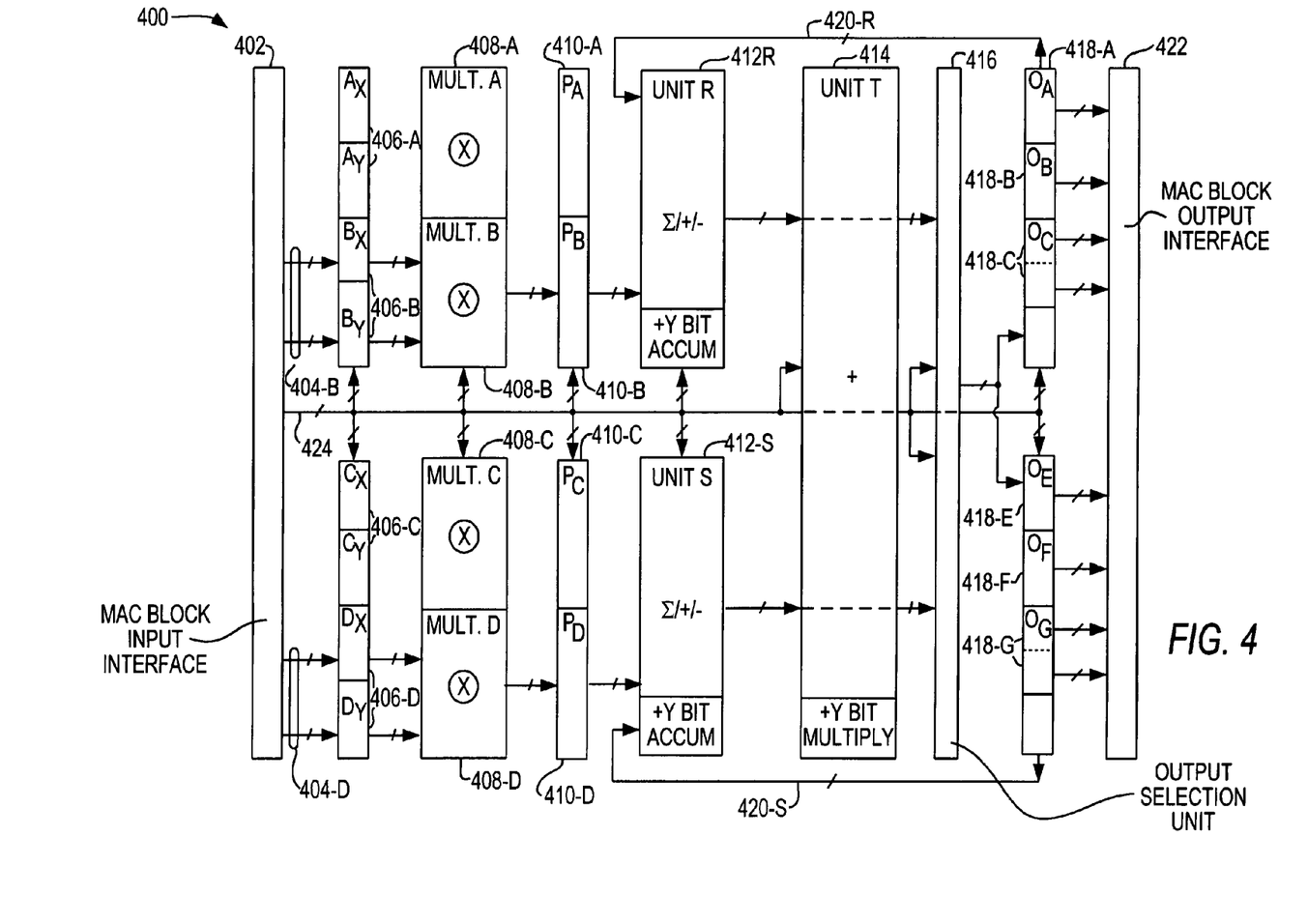
FIG. 4 is a more detailed but still simplified block diagram of a MAC block that implements a multiply-and-accumulate operation in accordance with the invention.

FIG. 4 shows a more detailed MAC block 400 that implements two independent multiply-and-accumulate operations. In this mode, MAC block 400 typically does not use all the circuitry such as input registers 406-A and 406-C, multipliers 408-A and 408-C, pipeline registers 410-A and 410-C, and an adder unit 414. Input registers 406-B and 406-D receive input signals 404 via MAC block input interface 402. The outputs of input registers 406-B and 406-D are sent as input to respective multipliers 408-B and 408-D, which each performs a multiplication operation on its inputs. The outputs of multipliers 408-B and 408-D are sent as input to respective pipeline registers 410-B and 410-C. The outputs of pipeline registers 410-B and 410-C are sent as input to respective add-subtract-accumulate units 412-R and 412-S which each adds or subtracts the input from respective pipeline registers 410-B and 410-D from an accumulator value received via respective feedback paths 420-R and 420-S. The outputs of add-subtract-accumulate units 412 are bypassed through adder 414 for input to output selection unit 416 before being sent to corresponding output registers 418 (e.g., the accumulator value produced by add-subtract-accumulate unit 412-R is sent to registers 418-A, 418-B, and 418-C; the accumulator value produced by add-subtract-accumulate unit 412-S is sent to registers 418-E, 418-F, and 418-G). The contents of output registers 418 are sent back to corresponding add-subtract-accumulate units 412 via corresponding feedback paths 420. The contents of output registers 418 are also sent for output out of MAC block 400 via MAC block output interface 422. Control signals 424 can be used to control the operation of input registers 406, multipliers 408, pipeline registers 410, add-subtract-accumulate units 412, adder unit 414, output selection unit 416, and output registers 418.

For clarity, the invention is described herein primarily in the context of a MAC block having eight input registers, four multipliers, four pipeline registers, two add-subtract-accumulate units, an adder, an output selection unit, and eight output registers. However, a MAC block can have other suitable numbers of input registers, multipliers, pipeline registers, add-subtract-accumulate units, adders, output selection units, and output registers, and with other suitable circuitry.

Also, for clarity, the invention is described herein primarily in the context of a MAC block implementing 18-bit by 18-bit multipliers with 52-bit add-subtract-accumulate units. The input registers can each store up to 18 data bits, the pipeline registers can each store up to 36 bits, the output selection unit can store up to 106 data bits, four of the output registers can store up to 18 data bits, another two of the output registers can store up to 8 data bits, and another two of the output registers can store up to 9 data bits. However, the input registers, pipeline registers, output selection unit, and output registers can each store other suitable numbers of bits, with the multipliers and add-subtract-accumulate units performing operations on other suitable numbers of bits.

Furthermore, for clarity, the invention is described herein primarily in the context of a MAC block implementing one mode of operation (e.g., two independent multiply-and-accumulate operations). However, the MAC block can implement mode splitting such that one independent multiply-and-accumulate operation and one or more other suitable modes of operation can be simultaneously implemented in the MAC block. The illustrative nature of this arrangement will be appreciated and it will be understood that the teachings of the invention may be applied to any other suitable type of MAC block having any suitable arrangement of component circuitries.

Figure 5:
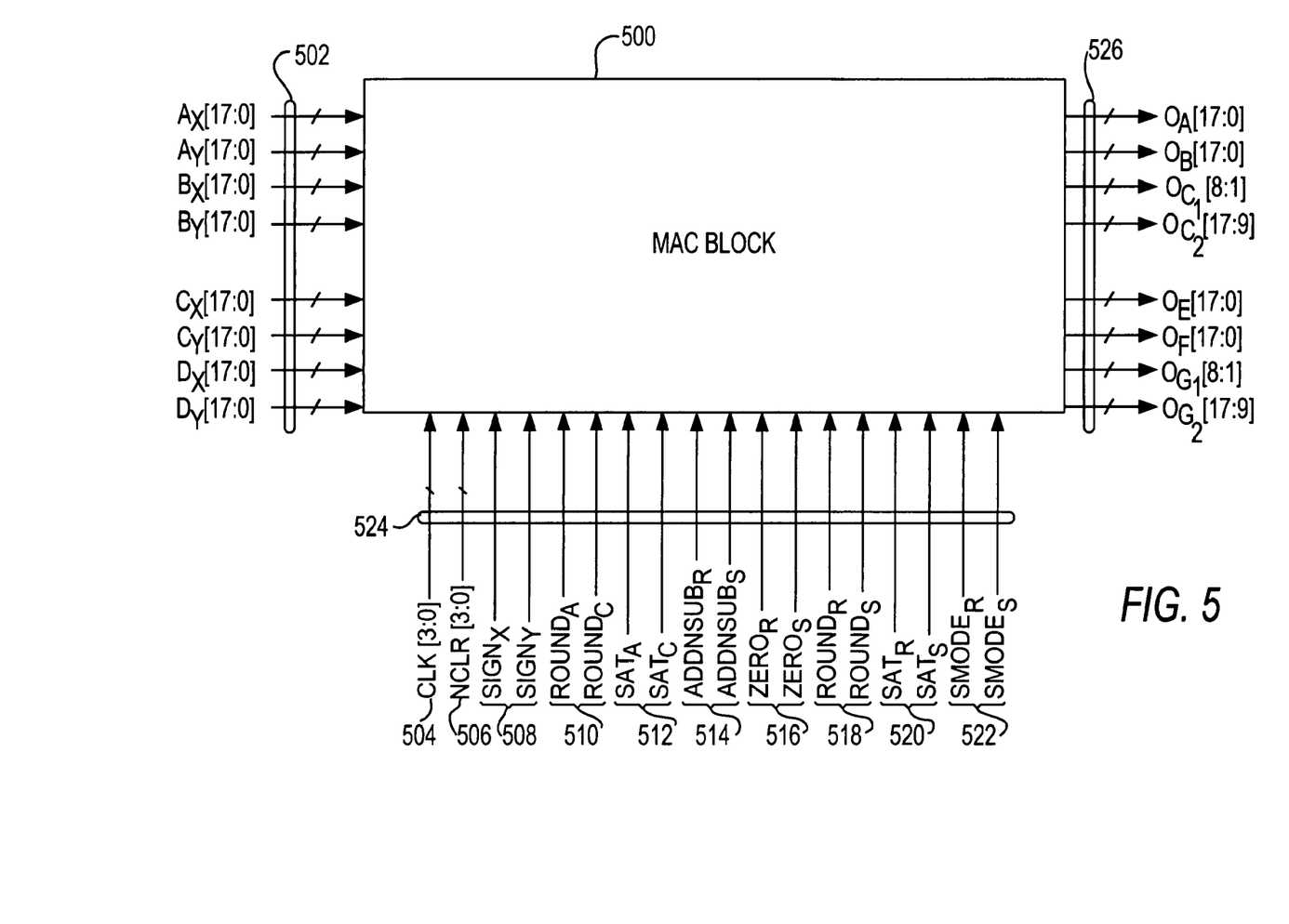
FIG. 5 is a simplified block diagram of the input and output signals of the MAC block of FIG. 4 in accordance with the invention.

FIG. 5 shows input and output signals associated with a MAC block 500 that implements two multiply-and-accumulate operations. MAC block 500 receives input signals 502 and control signals 524 and sends output signals 526. Input signals 502 can each transmit up to 18 data bits for input to a corresponding input register. Output signals 526 can each transmit data from a corresponding output registers, with four of the signals (e.g., $O_A$, $O_B$, $O_E$, $O_F$) transmitting up to 18 data bits, another two of the signals (e.g., $O_{C1}$, $O_{G1}$) transmitting up to 8 data bits, and another two of the signals (e.g., $O_{C2}$, $O_{G2}$) transmitting up to 9 data bits. Input signals 502 can be sent from, and output signals 526 can be sent to, any suitable source including other circuitry on or external to the programmable logic resource.

Control signals 524 can be used to control the operation of MAC block 500. To set MAC block 500 to implement in a multiply-and-accumulate mode, signals such as SMODE signals 522 and ZERO signals 516 (e.g., each of signals 522 and 516 can be used to control one independent multiply-and-accumulate operation) can be set to logic 1. (Although not shown, other signals can be used in combination with signals 516 and 522 to set MAC block 500 to implement one or more modes of operation. For example, to implement in a multiply-and-accumulate mode, the other signals can be set to logic 0). CLK signal 504 can be used to control the input of data into and the output of data from different registers. NCLR signal 506 can be used to clear the contents of different registers. SIGN signals 508 can be used to dynamically set the number representation (e.g., unsigned or signed 2's complement) for each input to the multipliers. ADDNSUB signals 514 can be used to indicate whether the output of a multiplier is to be added to or subtracted from an accumulator value in each add-subtract-accumulate unit. ROUND signals 510 and 518 and SAT signals 512 and 520 can be used to signal when the accumulator value corresponding to each of the add-subtract-accumulate units is to be zeroed or initialized in accordance with the invention (e.g., signals 510 and 512 and/or signals 518 and 520 are set to logic 0). Other suitable signals can also be used to set MAC block 500 to implement in a multiply-and-accumulate mode. Control signals 524 can be set, for example, by circuitry on or external to the programmable logic resource, by an algorithm or state machine operative to set control signals 524 based on predetermined conditions, by user input, or any combination of the same.

Figure 6:
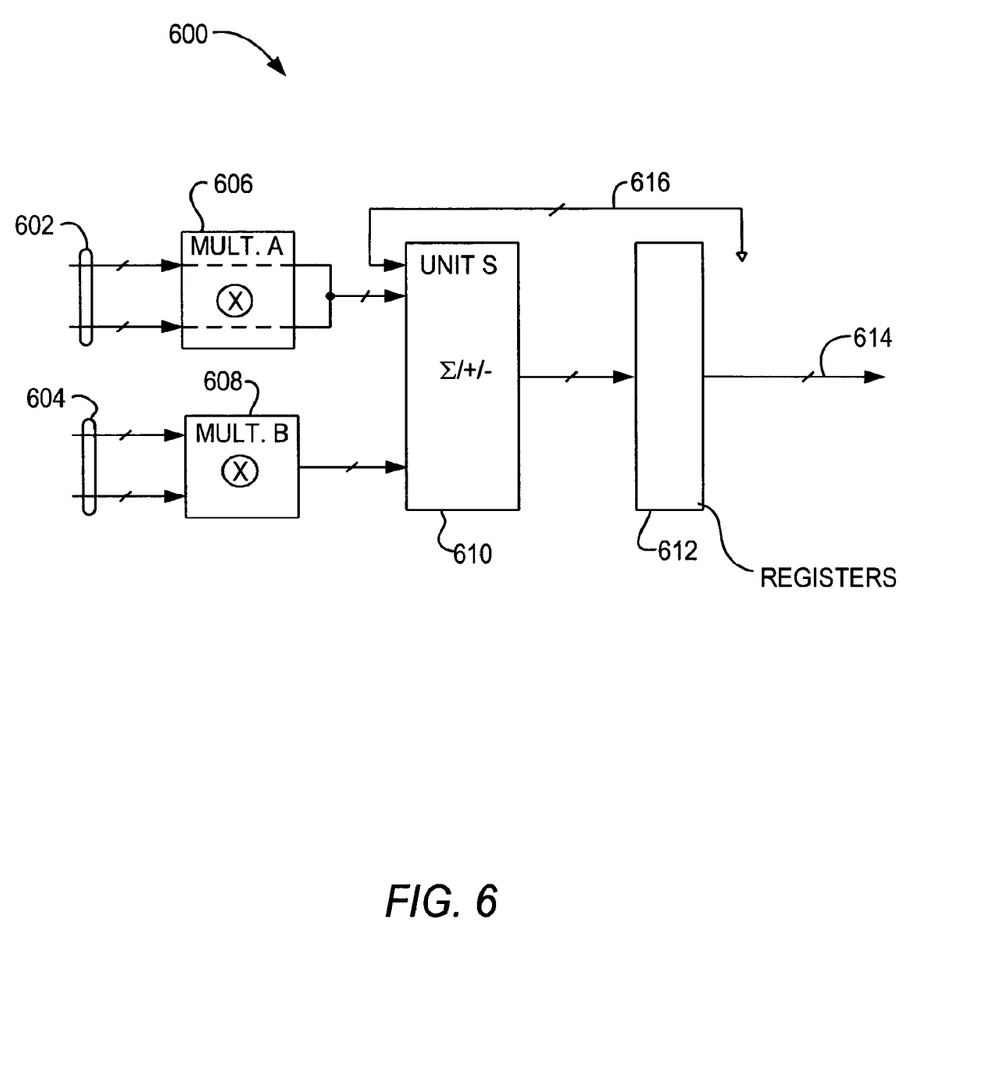
FIG. 6 is a simplified, partial block diagram of a MAC block showing a zeroing/initialization operation in accordance with the invention.

FIG. 6 shows a simplified, partial block diagram of a MAC block 600 that can zero or initialize an accumulator value during a multiply-and-accumulate operation in accordance with the invention. Block 600 includes two multipliers 606 and 608, an add-subtract-accumulate unit 610, and output registers 612. (For simplicity, the input registers, pipeline registers, adder unit, output selection unit, and control signals are not shown). Rather than using an NCLR signal (e.g., signal 506) to set the accumulator value to zero (i.e., clearing registers 612) which introduces clock latency, the accumulator value can be set to zero without introducing clock latency.

In one embodiment, when a parallel scan chain is not used, two multiplicand inputs 602 can be set to zero and sent directly to the output of multiplier 606 where inputs 602 are concatenated and sent as input to add-subtract-accumulate unit 610. Inputs 602 can be set to zero using external logic from the logic elements or using programmable inverts at the input registers (e.g., registers 406-A and 406-C). Inputs 602 can be used instead of a predetermined number of the most significant bits (e.g., 36 bits) in the feedback path to add-subtract-accumulate unit 610. A predetermined number of least significant bits (e.g., 16 bits) can be tied to ground (i.e., set to logic 0) and send to add-subtract-accumulate unit 610 via feedback path 616. The least significant bits from feedback path 616 can be concatenated to the concatenated inputs 602 to generate an accumulator value of zero.

In another embodiment, when a parallel scan chain is used, instead of setting the two multiplicand inputs 602 to zero, a pipeline register (e.g., registers 410-A or 410-C) can be cleared by enabling dedicated configuration bits (e.g., RPSETLOW$_A$, RPSETLOW$_C$). The dedicated configuration bits can be set by user input which may or may not be part of control signals 524. The least significant bits from feedback path 616, which are tied to ground, can be concatenated to the output of the pipeline register to generate an accumulator value of zero. In both embodiments, multiplier 608 receives two multiplicand inputs 604 that are multiplied to produce an output that is sent to add-subtract-accumulate unit 610 where it is added to or subtracted from the zeroed accumulator value during the same clock cycle. The new accumulator value is sent to registers 612 output via path 614.

In yet another embodiment, the accumulator value can be initialized in one clock cycle. Inputs 602 can be set to a value that represents a predetermined number of the most significant bits of an initialized value and sent directly to the output of multiplier 606 where inputs 602 are concatenated and sent as input to add-subtract-accumulate unit 610. The least significant bits from feedback path 616, which are tied to ground, can be concatenated to the concatenated inputs 602. Inputs 604 can be set to a value such that a result of a multiply operation on inputs 604 generates the least significant bits of the initialized value (e.g., one input can be set to logic 1, the other input can be set to the least significant bits of the initialized value). The output of multiplier 608 is sent to add-subtract-accumulate unit 610 where it is added to the concatenated value to generate the initialized value. When the parallel scan chain is used in the input registers, operation of the parallel scan chain must be paused during the clock cycle that the accumulator value is initialized or alternatively, the parallel scan chain can be implemented using logic elements.

Figure 7:
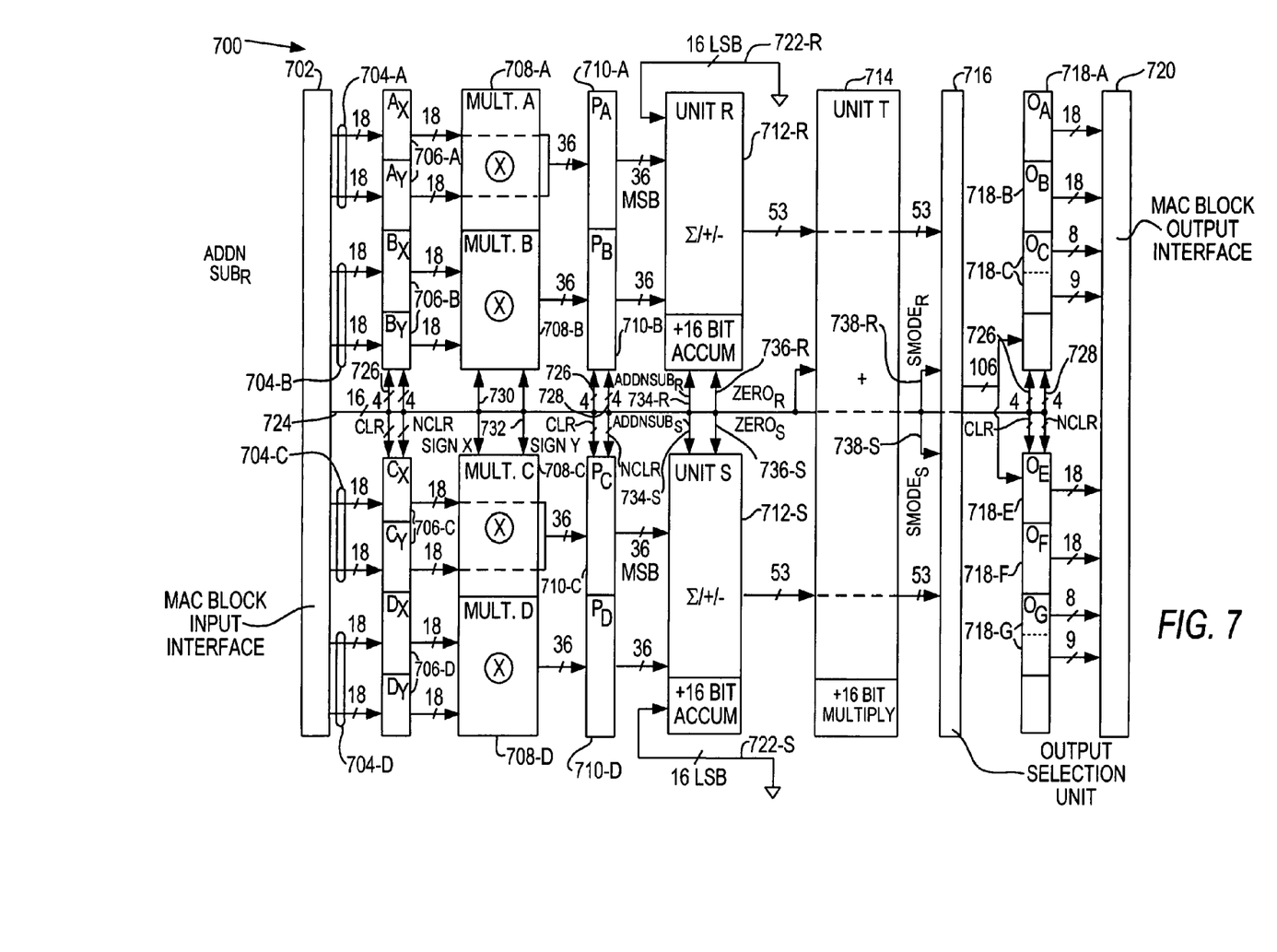
FIG. 7 is a more detailed but still simplified block diagram of a MAC block showing a zeroing operation in accordance with the invention.

FIG. 7 shows the flow of data in a more detailed MAC block 700 when the accumulator value is zeroed in accordance with an embodiment of the invention. Input signals 704 are received via MAC block input interface 702. When a parallel scan chain is not implemented in input registers 706, each input register 706-A and 706-C receives up to 18 data bits from respective input signals 704-A and 704-C that are set to zero. Multipliers 708-A and 708-C are bypassed so that the outputs of respective input registers 706-A and 706-C are concatenated and sent as input to respective pipeline registers 710-A and 710-C. When a parallel scan chain is not implemented in input registers 706, rather than setting input signals 704-A and 704-C to zero, pipeline registers 710-A and 710-C can be cleared by setting dedicated configuration bits. Pipeline registers 710-A and 710-C each include 36 bits of binary "0s," which form the 36 most significant bits of the accumulator value. During a same clock cycle, each input register 706-B and 706-D also receives up to 18 data bits from respective input signals 704-B and 706-D. Input signals 704-B and 706-D each include two multiplicand inputs that are sent as input to multipliers 708-B and 708-D that perform an 18-bit by 18-bit multiply operation to produce a 36-bit output that is sent to respective pipeline registers 710-B and 710-D.

The 16 least significant bits of the accumulator feedback, which represents the 16 least significant bits of the accumulator value, are tied to ground and sent via feedback paths 722-R and 722-S to respective add-subtract-accumulate units 712-R and 712-S where the bits are concatenated with data from respective pipeline registers 710-A and 710-C to generate a 52-bit zeroed accumulator value. The outputs from pipeline registers 710-B and 710-D are also sent as input to respective add-subtract-accumulate units 712-R and 712-S where the data is added to or subtracted from the zeroed accumulator value to produce a 53-bit output (e.g., 52-bit accumulator value and a 1-bit overflow/underflow signal). Adder unit 714 is bypassed so that the outputs of add-subtract-accumulate units 712 are sent as input to output selection unit 716 before being sent to corresponding output registers 718. The contents of output registers 718 are sent for output out of MAC block 700 via MAC block output interface 722. Control signals 724 can include CLK signals 726 (e.g., signals 504) and NCLR signals 728 (e.g., signals 506) used to control input registers 706, pipeline registers 710, and output registers 718; SIGNX signal 730 and SIGNY signal 732 (e.g., signals 508) used to set multipliers 708-B and 708-D; ADDNSUB signals 734 (e.g., signals 514) and ZERO signals 736 (e.g., signals 516) used to set add-subtract-accumulate units 712; and SMODE signals 738 (e.g., signals 522) used to control output selection unit 716.

Figure 8:
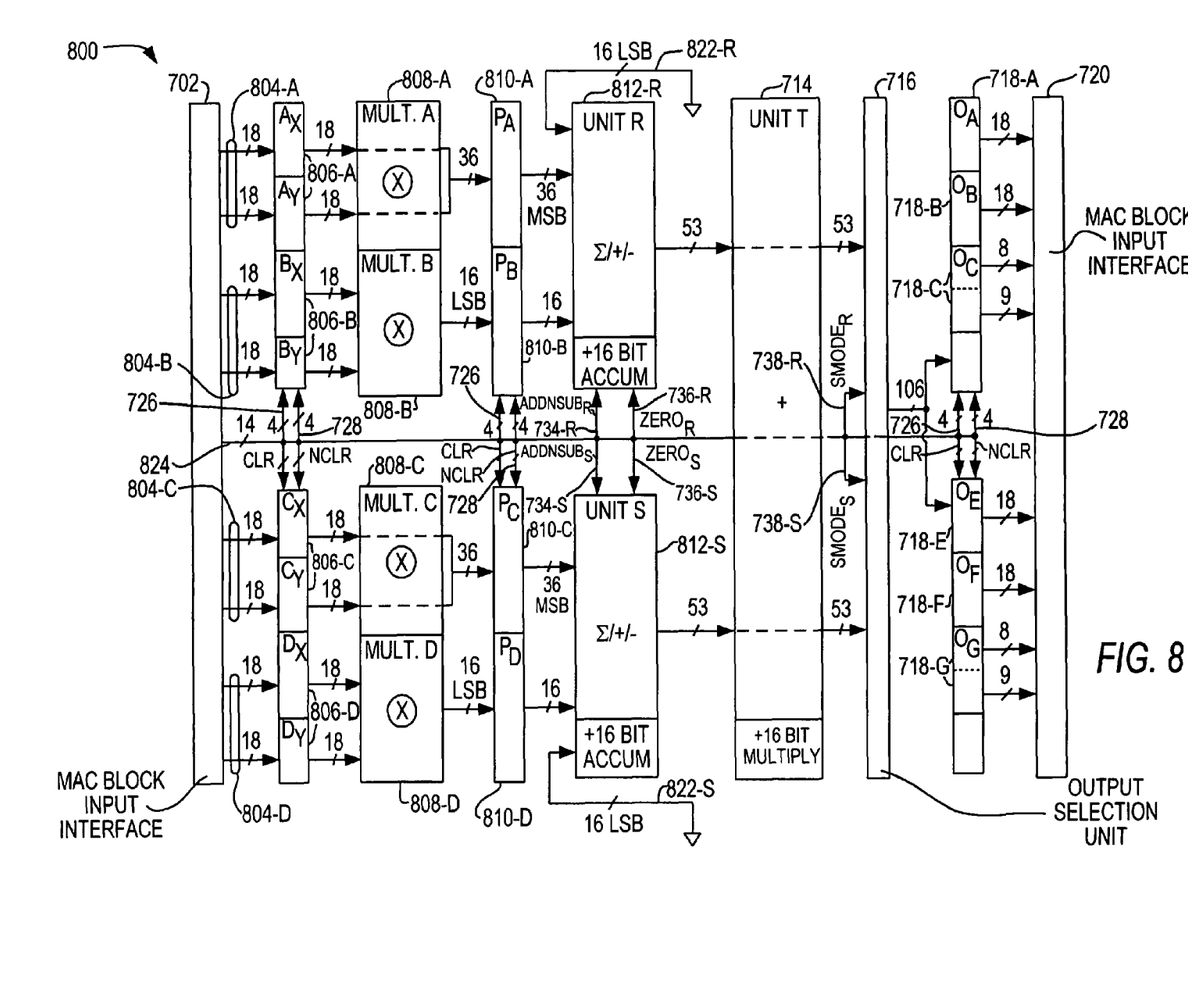
FIG. 8 is a more detailed but still simplified block diagram of a MAC block showing an initialization operation in accordance with the invention.

FIG. 8 shows the flow of data in a more detailed MAC block 800 when the accumulator value is initialized in accordance with an embodiment of the invention. MAC block 800 includes the same circuitry as MAC block 700, but some of the same circuitry have been labeled with different reference numerals for clarity in describing the flow of data for different embodiments. Each input register 806-A and 806-C receives up to 18 data bits from respective input signals 804-A and 804-C which represents the 36 most significant bits of an initialization value. Multipliers 808-A and 808-C are bypassed so that the outputs of respective input registers 804-A and 804-C are concatenated and sent as input to respective pipeline registers 810-A and 810-C. During a same clock cycle, each input register 806-B and 806-D receives up to 18 data bits from respective input signals 804-A and 804-C whose product, generated by respective multipliers 808-B and 808-D, represents the 16 least significant bits of the initialization value.

The 16 least significant bits of the accumulator feedback are tied to ground and sent via feedback paths 822-R and 822-S where the bits are concatenated with data from respective pipeline registers 710-A and 710-C and then added to data from respective pipeline registers 810-B and 810-D to produce a 52-bit initialized accumulator value. Control signals 824 can include some or all of the same signals used to control MAC block 700.

The accumulator value can be initialized using any suitable approach. For example, for each input register 806 that can store up to 18 bits (e.g., [17:0]), the initialized accumulator value can be represented by the following: {AX[15:0], AY[17:0], AX[17:16], 16 h'0000+MULT. B_OUT[15:0]} and {CX[15:0], CY[17:0], CX[17:16], 16 h'0000+MULT. D_OUT[15:0]}, {AX[17:0], AY[17:0], 16 h'0000+MULT. B_OUT[15:0]} and {CX[17:0], CY[17:0], 16 h'0000+ MULT. D_OUT[15:0]}, or any other suitable order.

For clarity, the invention is described herein primarily in the context of MULT. A and MULT C. being bypassed during multiply-and-accumulate operations and with MULT. B and MULT. D performing a multiply operations on its multiplicand inputs. However, for each pair of multipliers associated with a multiply-and-accumulate operation, either multiplier can be set to be bypassed with the other multiplier being set to perform a multiply operation.

Figure 9:
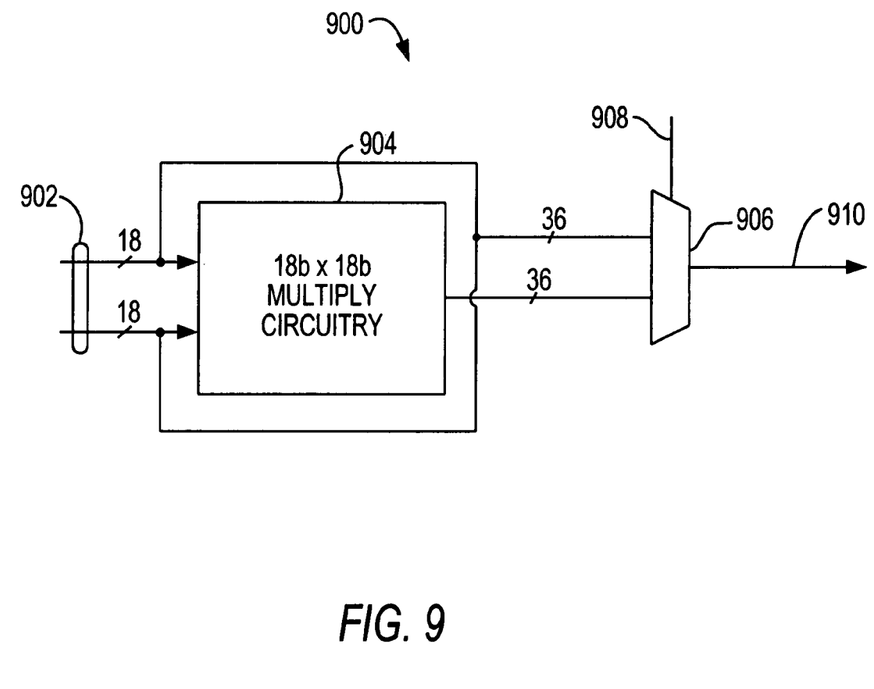
FIG. 9 is a more detailed but still simplified block diagram of one of the multipliers in FIGS. 6-8 in accordance with the invention.

FIG. 9 is a simplified block diagram of a multiplier 900 (e.g., multipliers 606, 708-A, 708-C, 808-A, 808-C) that is bypassed during a multiply-and-accumulate operation. Input signals 902 (e.g., signals 704-A, 704-C, 804-A, 804-C) can be concatenated and sent as one input to a 2-input:1-output (2:1) multiplexer 906. Input signals 902 can also be sent as input to multiply circuitry 904 that performs a multiply operation on input signals 902. The output of multiply circuitry 904 can be sent as another input to multiplexer 906. Multiplexer 906 can be controlled by a select signal 908 based on the mode of operation of a given MAC block. For example, if a MAC block is to implement a multiply-and-accumulate operation, to zero an accumulator value, or to initialize an accumulator value, select signal 908 selects as output 910 the concatenated input signals 902 (i.e., multiply circuitry 904 is bypassed); otherwise, select signal 908 selects as output 910 the output of multiply circuitry 904.

Figure 10:
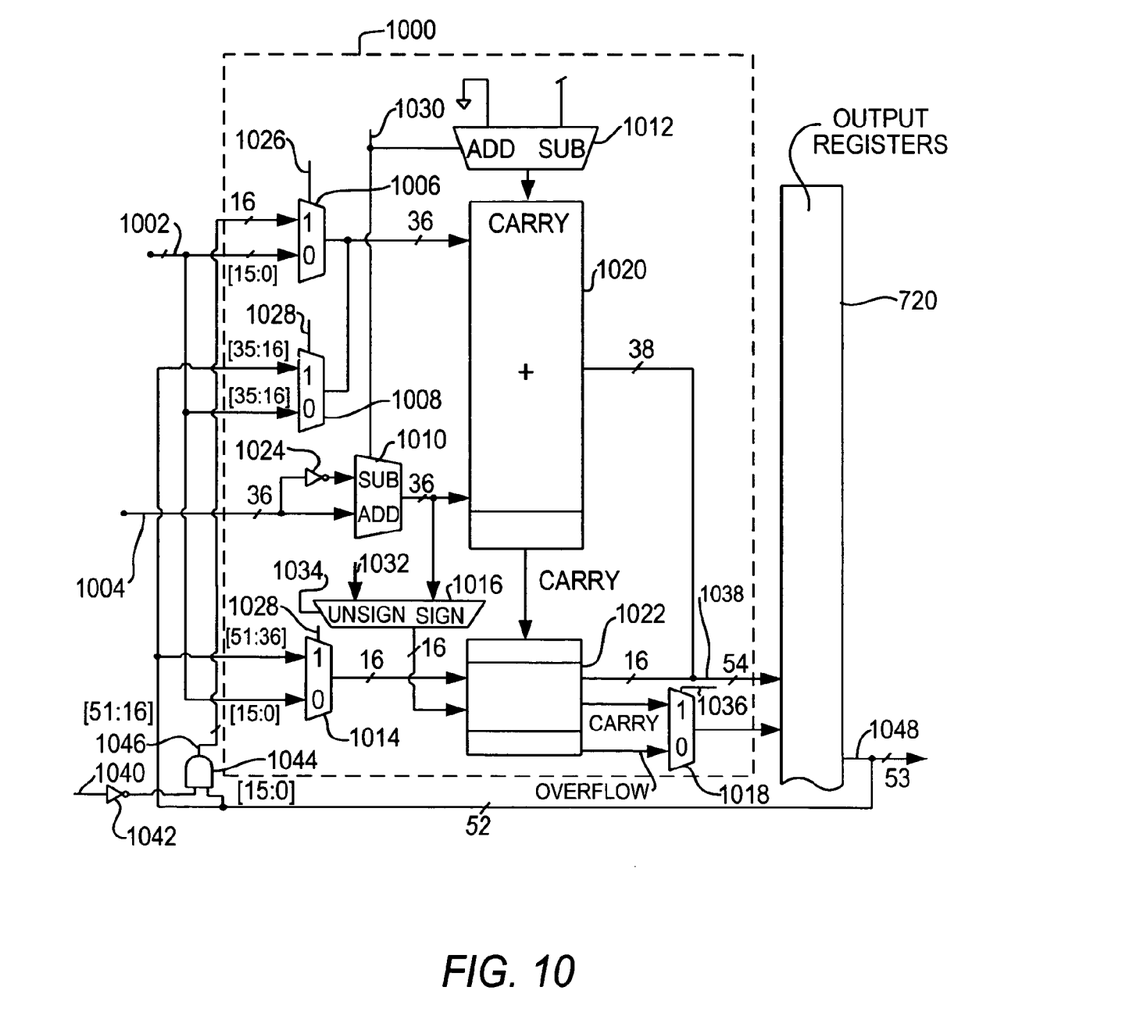
FIG. 10 is a more detailed but still simplified block diagram of one of the accumulators in FIGS. 6-8 in accordance with the invention.

FIG. 10 shows a more detailed diagram of a 52-bit add-subtract-accumulate unit 1000 (e.g., units 610, 712, 812). Unit 1000 can perform addition or subtraction between the outputs of two multipliers or alternatively, can perform accumulation by adding or subtracting an output of one of the multipliers from an accumulator value generated by unit 1000. Unit 1000 can include multiplexers 1006, 1008, 1010, 1012, 1014, 1016, and 1018, adders 1020 (e.g., 36-bit adder) and 1022 (e.g., 16-bit adder), and inverter 1024.

For a MAC block that can zero or initialize an accumulator value in accordance with the invention, an inverter 1042 and an AND gate 1044 are also provided in the feedback path 1048 (e.g., path 722 or 822) to cause a predetermined number of least significant bits (e.g., 16 data bits) to be set to zero. Inverter 1042 receives as input a signal 1040 indicating whether the accumulator value is to be zeroed or initialized. The output of inverter 1042 and the predetermined number of least significant bits from feedback path 1048 are sent as input to AND gate 1044. When the accumulator value is to be zeroed or initialized (e.g., signal 1040 is set to logic 1), AND gate 1044 outputs a signal 1046 set to zero.

Multiplexers 1006, 1008, and 1010 select data for input to adder 1020. Multiplexer 1006 receives as input the 16 least significant bits of data 1002 from a pipeline register $P_A$ or $P_C$ (e.g., registers 710-A/810-A or 710-C/810-C) and signal 1046. Multiplexer 1006 is controlled by a select signal 1026 that indicates whether unit 1000 is to perform a multiply-and-accumulate operation, to zero the accumulator value, or to initialize the accumulator value. If unit 1000 is to perform a multiply-and-accumulate operation, to zero the accumulator value, or to initialize the accumulator value (e.g., signal 1026 is set to logic 1), multiplexer 1006 sends signal 1046 to adder 1020; otherwise, multiplexer 1006 sends part of data 1002 to adder 1020.

Multiplexer 1008 receives as input the next 20 significant bits of data (e.g., bits [35:16]) from both feedback path 1048 and output 1002. Multiplexer 1008 is controlled by a select signal 1028 that indicates whether unit 1000 is to perform a multiply-and-accumulate operation. If unit 1000 is to perform a multiply-and-accumulate operation (e.g., signal 1028 is set to logic 1), multiplexer 1008 sends that data from feedback path 1048 to adder 1020; otherwise, multiplexer 1008 sends part of data 1002 to adder 1020.

Multiplexer 1010 receives as input data 1004 from a pipeline register $P_B$ or $P_D$ (e.g., registers 710-B/810-B or 710-D/810-D) and the complement of data 1004 (via inverter 1024). Multiplexer 1010 is controlled by a select signal 1030 that indicates whether unit 1000 is to perform addition or subtraction in adder 1020. If unit 1000 is to perform addition, multiplexer 1010 sends data 1004 to adder 1020. If unit 1000 is to perform subtraction, unit 1000 uses two's complement numbering by sending the complement of data 1004 through multiplexer 1010 and a carry bit (e.g., a "1" input) through multiplexer 1012 (which is also controlled by select signal 1030) to adder 1020.

Multiplexer 1014 receives as input the 16 most significant bits of data (e.g., bits [51:36]) from both feedback path 1048 and the 16 least significant bits of data 1002. Multiplexer 1014 is controlled by select signal 1028. If unit 1000 is to perform a multiply-and-accumulate operation (e.g., signal 1028 is set to logic 1), multiplexer 1014 sends that data from feedback path 1048 to adder 1022; otherwise, multiplexer 1014 sends part of data 1002 to adder 1022.

Unit 1000 can perform a number of different operations. If unit 1000 is to perform addition or subtraction between the outputs of two multipliers, multiplexers 1006, 1008, 1010, and 1014 select as outputs the 36-bit results generated by each of the two multipliers (e.g., data 1002 and 1004). If unit 1000 is to perform a typical multiply-and-accumulate operation, multiplexers 1006, 1008, 1010, and 1014 select as outputs the 36-bit result generated by one of the multipliers (e.g., data 1004) and the 52-bit accumulator value sent from feedback path 1048. If unit 1000 is to zero an accumulator value, multiplexers 1006, 1008, 1010, and 1014 select as outputs 36-bits that are set to zero (e.g., data 1002), the 16 least significant bits from feedback path 1048 that are set to zero, and the 36-bit result generated by one of the multipliers (e.g., data 1004). If unit 1000 is set to initialize the accumulator value, multiplexers 1006, 1008, 1010, and 1014 select as outputs 36-bits that are set to the 36 most significant bits of the initialized value (e.g., data 1002), the 16 least significant bits from feedback path 1048 that are set to zero, and the 16 least significant bits of the result generated by one of the multipliers (e.g., data 1004).

The outputs of multiplexers 1006, 1028, and 1010 are sent as input to adder 1020, which can be a 36-bit adder. Multiplexer 1016 receives as input data from the output of multiplexer 1010 and a signal 1032 that indicates whether the output of a multiplier is to be added to or subtracted from an accumulator value (e.g., ADDNSUB signal 514). Multiplexer 1016 can be controlled by a select signal 1034 that indicates whether that data is signed or unsigned and can send one of the inputs to adder 1022. Adder 1022, which can be a 16-bit adder, receives the output from multiplexer 1016, a carry bit generated from adder 1020, and the output of multiplexer 1014, and performs an additional add operation for the remainder of an accumulation operation. The output of adders 1020 and 1022 are concatenated to generate an output signal 1038 that is sent to an output selection unit (not shown) and then to output registers 720. Adder 1022 also outputs a carry bit and an overflow bit that are sent as input to multiplexer 1018 controlled by a select signal 1036. Select signal 1036 indicates whether unit 1000 is unsigned and whether signal 1032 (e.g., ADDNSUB signal 514) is set. When the accumulator is performing unsigned addition, the overflow bit is equal to the output carry bit. When the accumulator is performing unsigned subtraction, the overflow bit is equal to the complement of the output carry bit. When the accumulator is performing signed addition or subtraction, the overflow bit is equal to the exclusive OR of the input carry bit and the output carry bit. The output of multiplexer 1018 is also sent to output registers 720. Logic elements may be used to clear the overflow bit in output registers 720.

Figure 11:
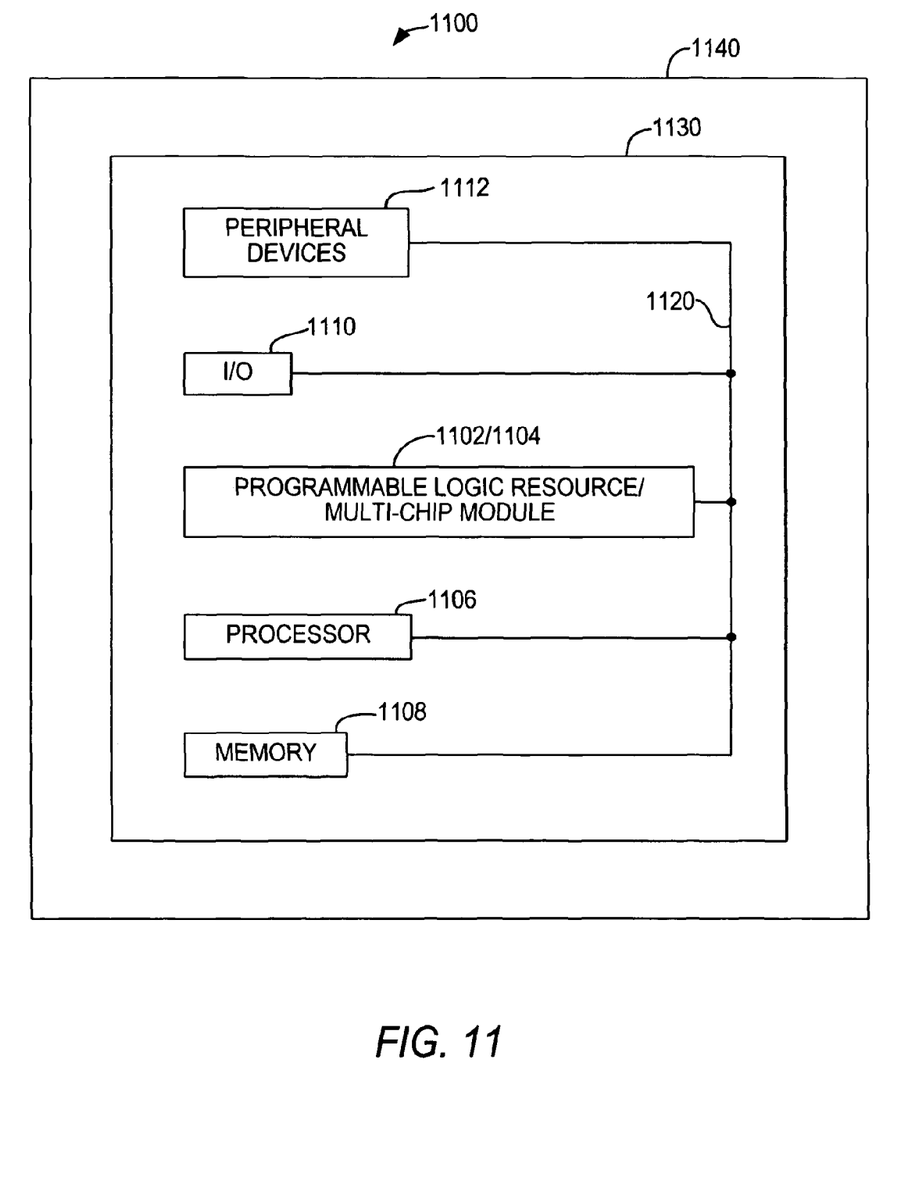
FIG. 11 is a simplified schematic block diagram of a system employing a programmable logic resource, multi-chip module, or other suitable device in accordance with the invention.

FIG. 11 illustrates a programmable logic resource 1102 or a multi-chip module 1104 which includes embodiments of this invention in a data processing system 1100. Data processing system 1100 can include one or more of the following components: a processor 1106, memory 1108, I/O circuitry 1110, and peripheral devices 1112. These components are coupled together by a system bus or other interconnections 1120 and are populated on a circuit board 1130 which is contained in an end-user system 1140.

System 1100 can be used in a wide variety of applications, such as computer networking, data networking, instrumentation, video processing, digital signal processing, or any other application where the advantage of using programmable or reprogrammable logic is desirable. Programmable logic resource/module 1102/1104 can be used to perform a variety of different logic functions. For example, programmable logic resource/module 1102/1104 can be configured as a processor or controller that works in cooperation with processor 1106. Programmable logic resource/module 1102/1104 may also be used as an arbiter for arbitrating access to a shared resource in system 1100. In yet another example, programmable logic resource/module 1102/1104 can be configured as an interface between processor 1106 and one of the other components in system 1100. It should be noted that system 1100 is only exemplary, and that the true scope and spirit of the invention should be indicated by the following claims.

Various technologies can be used to implement programmable logic resources 1102 or multi-chip modules 1104 having the features of this invention, as well as the various components of those devices (e.g., programmable logic connectors ("PLCs") and programmable function control elements ("FCEs") that control the PLCs). For example, each PLC can be a relatively simple programmable connector such as a switch or a plurality of switches for connecting any one of several inputs to an output. Alternatively, each PLC can be a somewhat more complex element that is capable of performing logic (e.g., by logically combining several of its inputs) as well as making a connection. In the latter case, for example, each PLC can be a product term logic, implementing functions such as AND, NAND, OR, or NOR. Examples of components suitable for implementing PLCs include EPROMs, EEPROMs, pass transistors, transmission gates, antifuses, laser fuses, metal optional links, etc. PLCs and other circuit components may be controlled by various, programmable, function control elements ("FCEs"). For example, FCEs can be SRAMS, DRAMS, magnetic RAMS, ferro-electric RAMS, first-in first-out ("FIFO") memories, EPROMS, EEPROMs, function control registers, ferro-electric memories, fuses, antifuses, or the like. From the various examples mentioned above it will be seen that this invention is applicable to both one-time-only programmable and reprogrammable resources.

Thus it is seen that a MAC block is provided that can zero the accumulator with zero clock latency and initialize the accumulator in one clock cycle during multiply-and-accumulate operations. One skilled in the art will appreciate that the invention can be practiced by other than the prescribed embodiments, which are presented for purposes of illustration and not of limitation, and the invention is limited only by the claims which follow.

What is claimed is:

1. A multiplier-accumulator block operative to zero or initialize an accumulator output value comprising:
   a first multiplier having a first input operative to receive a first input signal, a second input operative to receive a second input signal, and a first output, wherein the first input signal and the second input signal are concatenated in a predetermined order and sent to the first output;
   a second multiplier having a first input operative to receive a third input signal, a second input operative to receive a fourth input signal, and a second output, wherein the first multiplier is separate and distinct from the second multiplier, and wherein the first multiplier operates in parallel with the second multiplier;
   an accumulator having a first input operative to receive the first output, a second input operative to receive the second output, a third input operative to receive a feedback output, and an accumulator output, wherein the feedback output is set to zero; and
   a register block having an input operative to receive the accumulator output and a register block output, wherein the first input signal and the second input signal are both set to zero, and wherein the feedback output is concatenated to the first output.

2. The multiplier-accumulator block of claim 1 wherein the second multiplier applies a multiply operation on the third input signal and the fourth input signal, wherein a result of the multiply operation is sent to the second output.

3. The multiplier-accumulator block of claim 1 wherein the accumulator:
   adds the second output to the accumulator output.

4. The multiplier-accumulator block of claim 1 wherein the accumulator:
   subtracts the second output from the accumulator output.

5. The multiplier-accumulator block of claim 1 wherein:
   the first input signal and the second signal are set to values such that the first output comprises a first predetermined number of most significant bits of the accumulator value; and
   the third input signal and the fourth input signal are set to values such that the second output comprises a second predetermined number of least significant bits of the accumulator.

6. The multiplier-accumulator block of claim 5 wherein the feedback output has a number of bits equal to the second predetermined number.

7. The multiplier-accumulator block of claim 5 wherein the accumulator:
   concatenates the feedback output to the first output to generate a concatenated value; and
   adds the second output to the concatenated value to generate the accumulator output.

8. A programmable logic resource comprising the multiplier-accumulator block of claim 1.

9. A digital processing system comprising:
   processing circuitry;
   a memory coupled to the processing circuitry; and
   a programmable logic resource as defined in claim 8 coupled to the processing circuitry and the memory.

10. A printed circuit board on which is mounted a programmable logic resource as defined in claim 8.

11. The printed circuit board defined in claim 10 further comprising:
   a memory mounted on the printed circuit board and coupled to the programmable logic resource.

12. The printed circuit board defined in claim 11 further comprising:
   processing circuitry mounted on the printed circuit board and coupled to the programmable logic resource.

13. The multiplier-accumulator block of claim 1 wherein:
   the first and second inputs of the first multiplier and the first and second inputs of the second multiplier are each different.

14. A method for operating a multiplier-accumulator block operative to zero or initialize an accumulator output, the method comprising:
   receiving, at a first input of a first multiplier, a first input signal;
   receiving, at a second input of the first multiplier, a second input signal;
   receiving, at a first input of a second multiplier, a third input signal;
   receiving, at a second input of the second multiplier, a fourth input signal, wherein the first multiplier is separate and distinct from the second multiplier, and wherein the first multiplier operates in parallel with the second multiplier;
   receiving a first output of the first multiplier and a second output of the second multiplier at an accumulator having a first input operative to receive the first output and a second input operative to receive the second output, wherein the first input signal and the second input signal are concatenated in a predetermined order and sent to the first output;

receiving, at a third input of the accumulator, a feedback output, wherein the feedback output is set to zero; and receiving, at an input of a register block, an output of the accumulator, wherein the first input signal and the second input signal are both set to zero, and wherein the feedback output is concatenated to the first output.

15. A non-transitory machine-readable medium comprising instructions for operating a multiplier-accumulator block operative to zero or initialize an accumulator output, the instructions comprising:

instructions to receive, at a first input of a first multiplier, a first input signal;

instructions to receive, at a second input of the first multiplier, a second input signal;

instructions to receive, at a first input of a second multiplier, a third input signal;

instructions to receive, at a second input of the second multiplier, a fourth input signal, wherein the first multiplier is separate and distinct from the second multiplier, and wherein the first multiplier operates in parallel with the second multiplier;

instructions to receive a first output of the first multiplier and a second output of the second multiplier at an accumulator having a first input operative to receive the first output and a second input operative to receive the second output, wherein the first input signal and the second input signal are concatenated in a predetermined order and sent to the first output;

instructions to receive, at a third input of the accumulator, a feedback output, wherein the feedback output is set to zero; and instructions to receive, at an input of a register block, an output of the accumulator, wherein the first input signal and the second input signal are both set to zero, and wherein the feedback output is concatenated to the first output.

* * * * *